Feb. 9, 1932.   I. I. SIKORSKY   1,844,608
AIRCRAFT INCLUDING ENGINE MOUNTING FRAME FOR SAME
Original Filed June 7, 1929   6 Sheets-Sheet 1
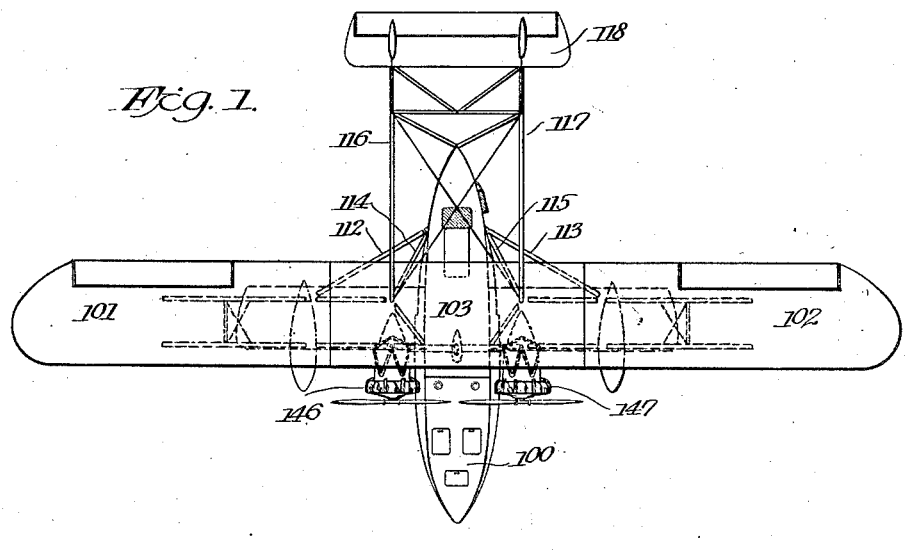
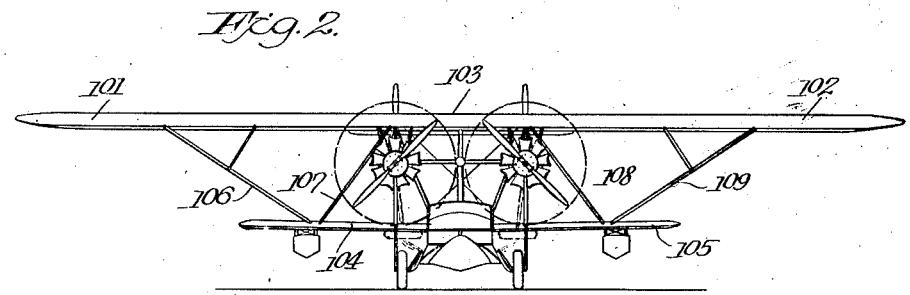
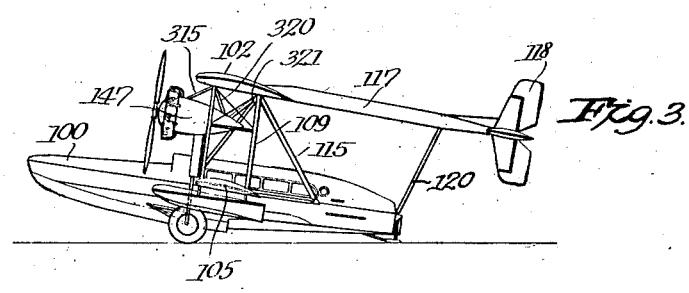
Igor I. Sikorsky,
INVENTOR
BY
ATTORNEY

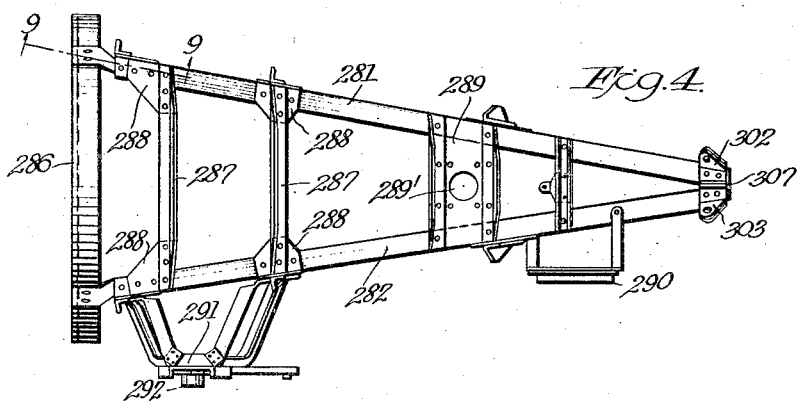
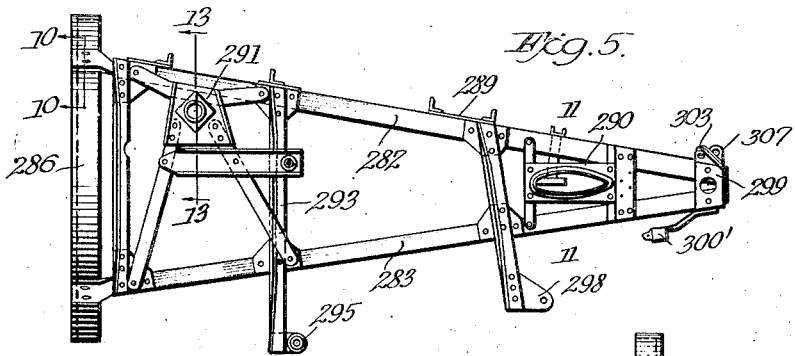
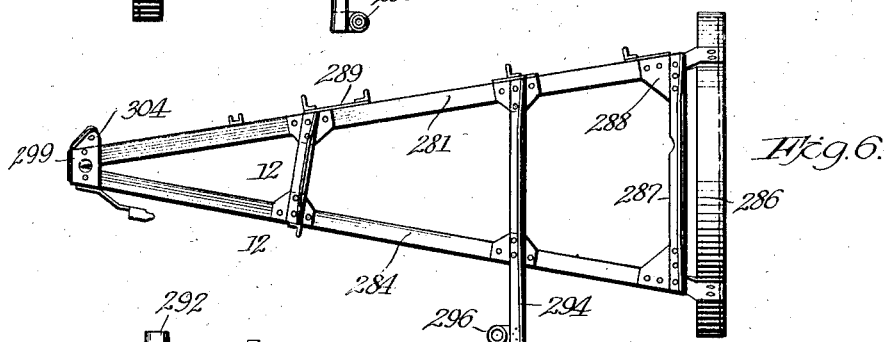
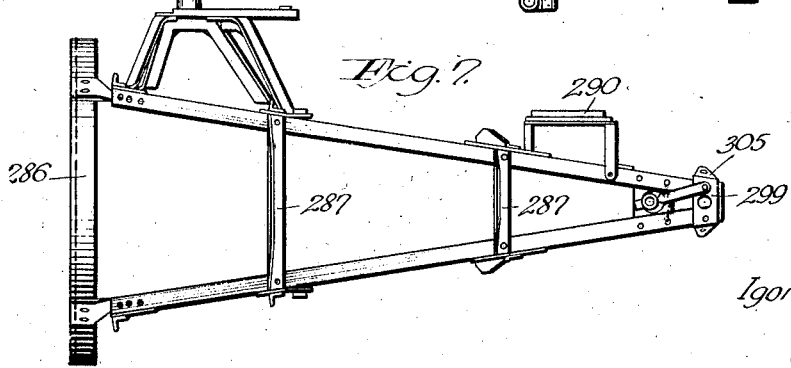

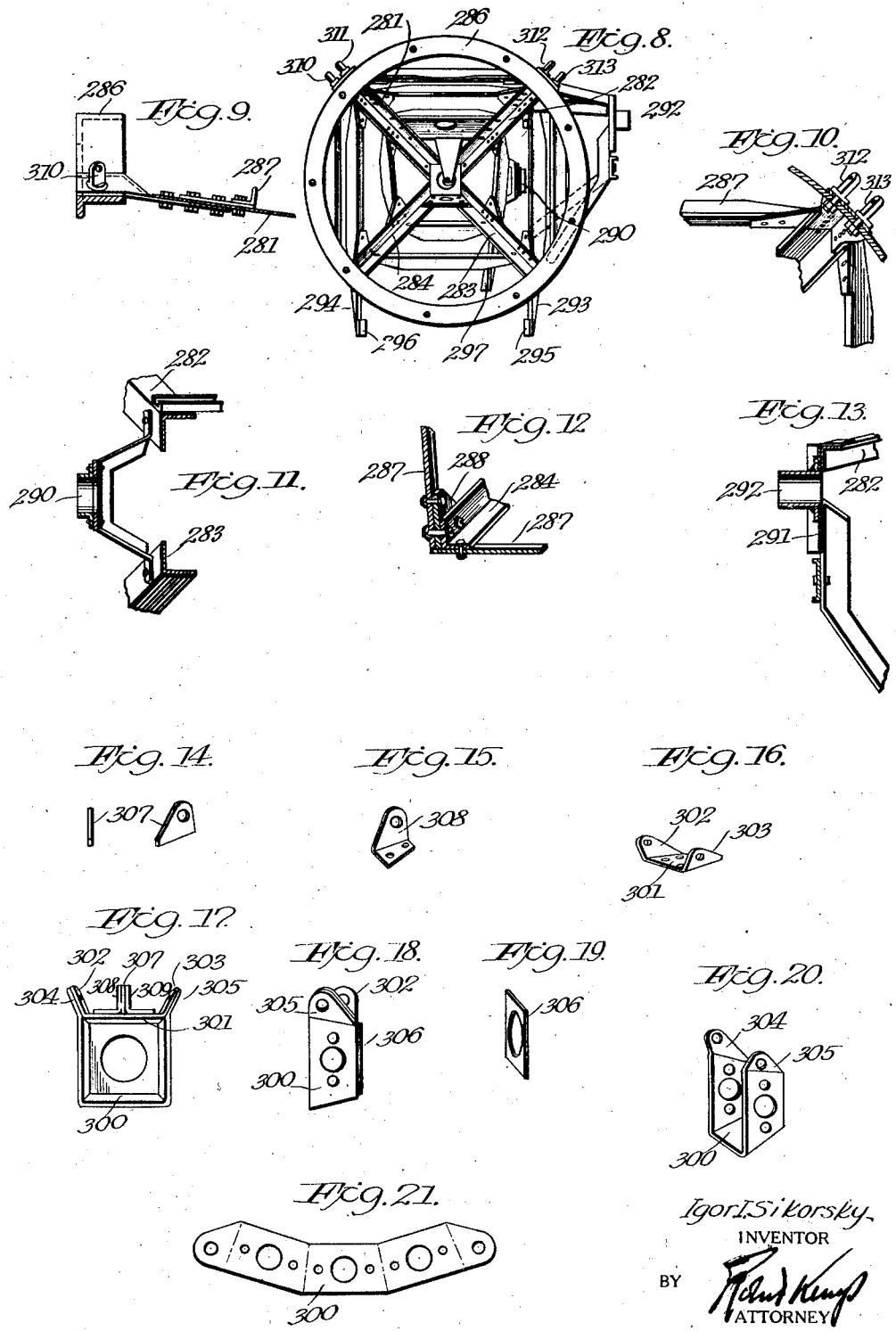

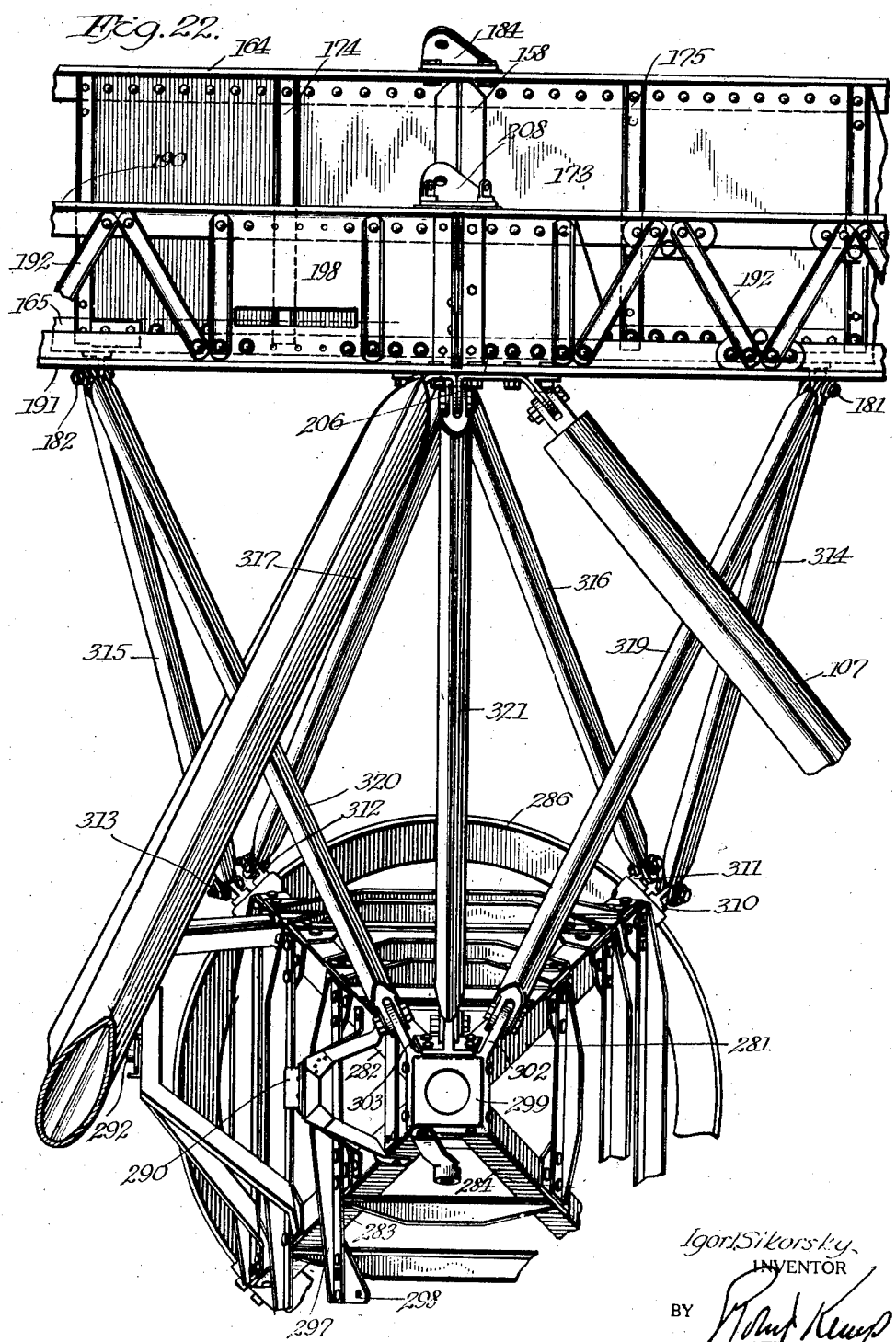

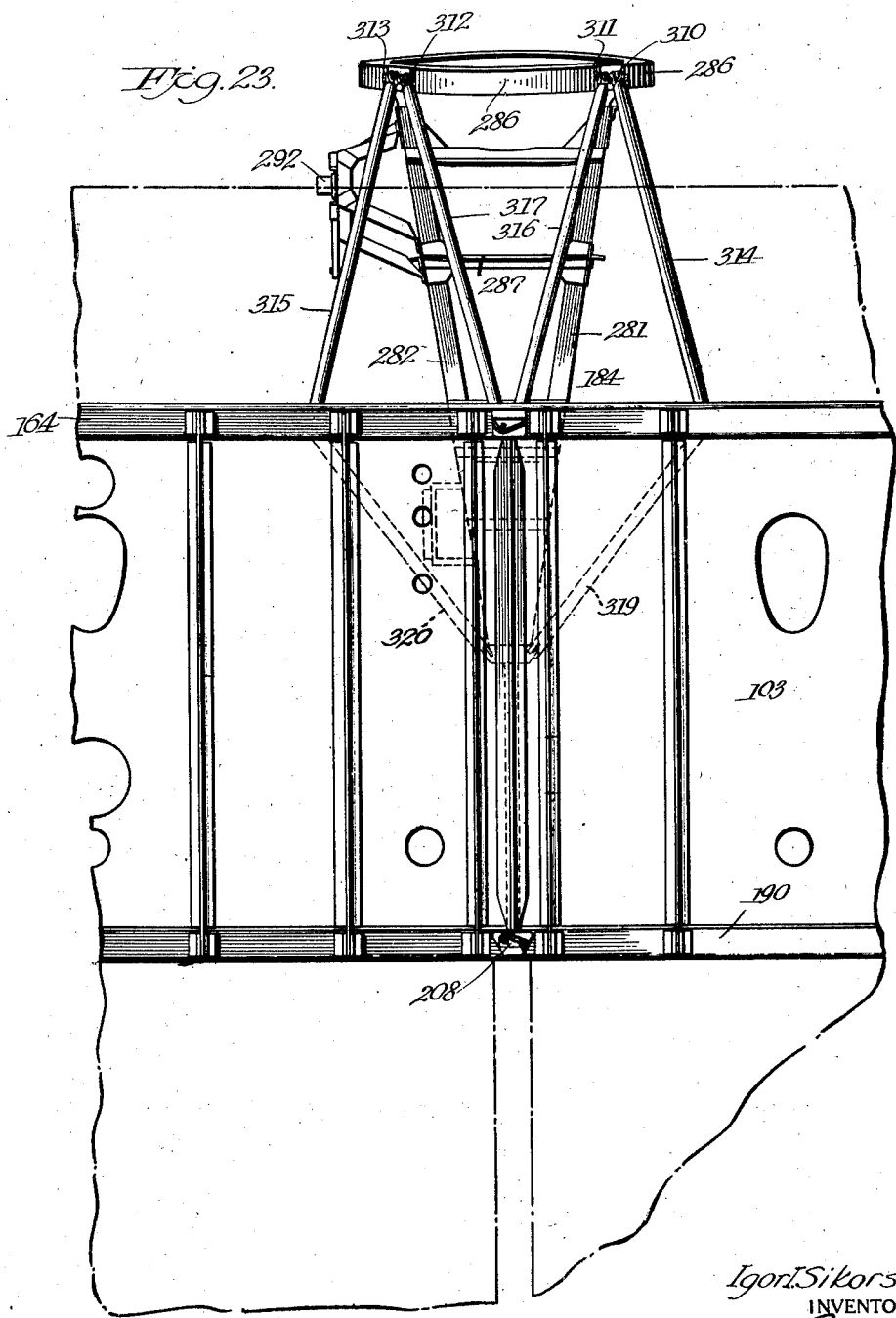

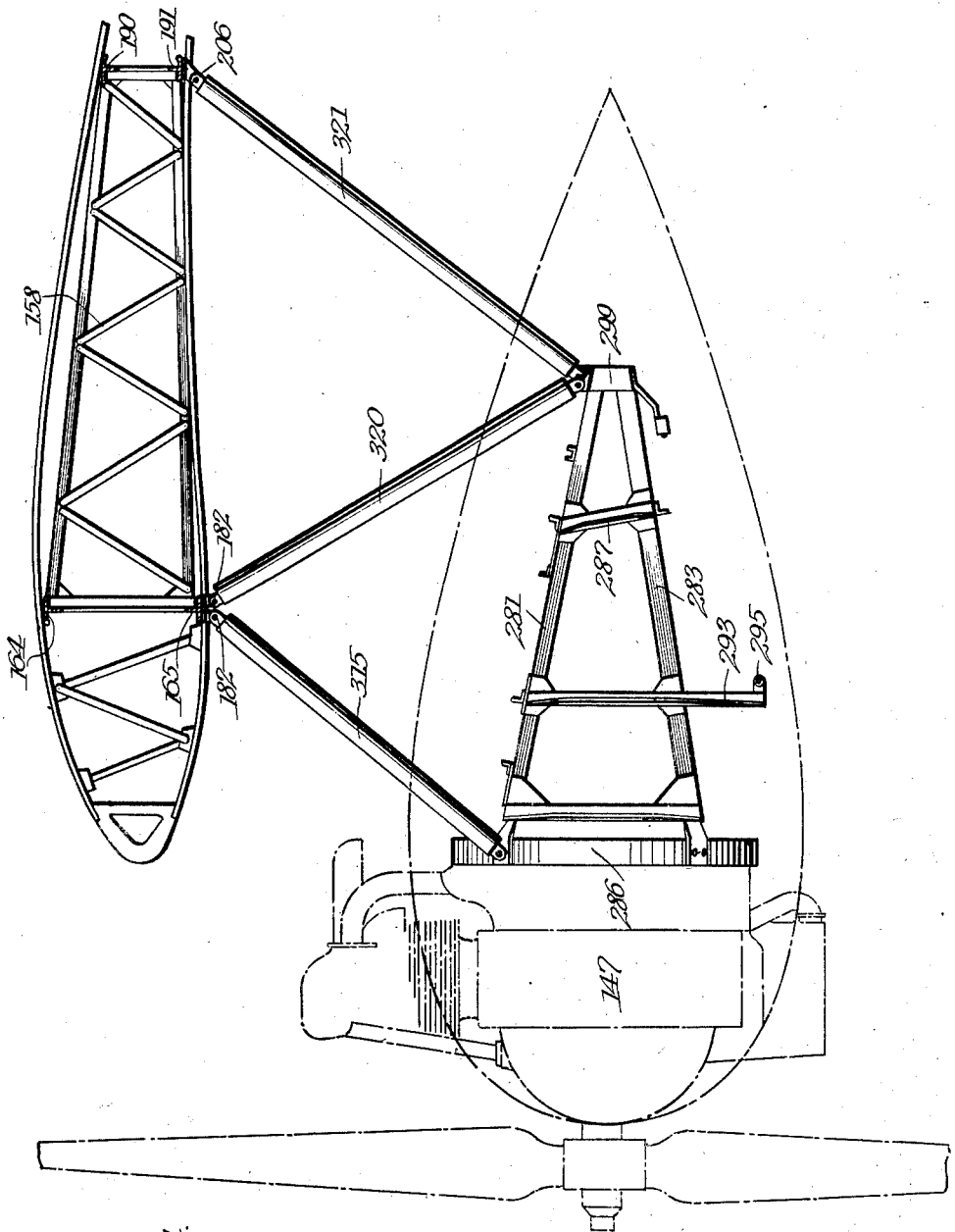

Patented Feb. 9, 1932

1,844,608

UNITED STATES PATENT OFFICE

IGOR I. SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AIRCRAFT INCLUDING ENGINE MOUNTING FRAME FOR SAME

Original application filed June 7, 1929, Serial No. 369,113. Divided and this application filed August 12, 1929. Serial No. 385,217.

The present invention relates to improvements in amphibians and particularly to means for supporting the engine or engines on such craft.

The present application is a division of an earlier filed case, Serial #369,113, filed June 7, 1929, and for purposes of disclosing the invention, the embodiment hereinafter described has been shown as applied to a multi-motor amphibian.

In the accompanying drawings:

Figure 1 is a plan view of a multi-motor amphibian having an embodiment of the present invention applied thereto.

Figure 2 is a front elevation of the same.

Figure 3 is a side elevation.

Figure 4 is a plan view, on an enlarged scale, of one of the engine supporting frames detached.

Figure 5 is an elevation of such frame from the left hand side.

Figure 6 is a similar view of the opposite side of the engine supporting frame.

Figure 7 is a bottom view of said frame.

Figure 8 is a front elevation of the frame shown in Figures 4 to 7.

Figure 9 is a detail section, substantially on the line 9—9 of Figure 4.

Figure 10 is a section on the line 10—10 of Figure 5.

Figure 11 is a section substantially on the line 11—11 of Figure 5.

Figure 12 is a detail section, substantially on the line 12—12 of Figure 6.

Figure 13 is a detail section, substantially on the line 13—13 of Figure 5.

Figure 14 illustrates in end elevation and perspective one element of the box like member at the rear end of the engine supporting frame.

Figures 15 and 16 are perspective views of two other elements of said box like member.

Figure 17 is an end elevation of said box like member at the rear end of the engine supporting frame.

Figure 18 is a side elevation of said box like member.

Figure 19 is a view of the rear end plate of the box like member detached.

Figure 20 is a perspective view of the bottom and side walls of said box like member.

Figure 21 is a plan of the blank from which the bottom and side walls of said box like member are preferably formed.

Figure 22 is a rear elevation of the engine supporting frame and its connections with the frame of the center section of the main plane, on a larger scale, portions only of the plane frame being shown.

Figure 23 is a plan of parts shown in view 22.

Figure 24 is a vertical sectional view through the center section of the main plane showing the engine supporting frame and the suspension means therefor in elevation.

Referring to the drawings in the several views of which corresponding parts are designated by the same reference characters, 100 designates the body-boat of the amphibian which is shown as being supported beneath a main plane comprising right and left wings 101 and 102, respectively, and a center section 103.

Lower wings 104 and 105 project laterally from the body-boat beneath the upper or main plane.

The two sets of planes are suitably supported by means of interplane struts, certain of which are indicated at 106, 107, 108 and 109.

Additional struts are interposed between the main plane and the body-boat, and struts 112 and 113 connect the lower wings 104, 105, respectively, with the body-boat, while struts 114 and 115 are interposed between the upper wings and the rear portion of the body-boat.

Outriggers 116 and 117 project rearwardly from the center section 103 of the main plane, and support at their rear ends an empennage assembly designated as a whole by the reference character 118. The rear portions of the outriggers are shown as being supported from the rear extremity of the body-boat by struts 120.

The amphibian illustrated is provided with two motors or engines 146, 147 which are supported by means that will now be more particularly described.

As shown, the motors or engines are supported beneath the center section 103 of the main plane. Such section of the main plane includes (see Figure 24) front and rear spars 155, 156 connected by suitable compression members 158. The front spar 156 comprises a pair of vertically spaced angle iron members 164, 165 which are connected by suitable truss members and reinforced above each motor or engine supported frame by vertically extending plates 173 and members 174, 175.

The rear spar is of somewhat similar construction including vertically spaced angle iron members 190, 191 connected by suitable truss members and reinforced above each engine supporting frame by vertically extending plates 198.

The front and rear spar members, above each reinforced section from which the engine supporting frames are suspended, are shown as provided with apertured cable attachment members 184, 208 to which cables may be attached when the machine is to be hoisted by external means.

As shown the amphibian selected for purposes of illustration is provided with two engines but, as these are duplicates only, one suspension means is hereinafter specifically described.

The engine supporting frame per se, is of substantially pyramidal form with its reduced end directed toward the rear, and is formed of four main angle bars 281, 282, 283 and 284. The divergent ends of said frame are suitably connected to a ring 286 in which the motor is adapted to be directly supported.

This ring may be in the nature of a single flanged forging, or formed of an L-bar bent into a circle, and having its abutting ends welded together. Such ring is adapted to have a radial motor bolted directly thereto, although it may be employed for supporting a rotary motor.

The main bars 281, 282, 283 and 284 of the engine support are connected and braced by transversely extending angle bars 287, and the connections between said bars may be reinforced by bracing plates 288. The members 281, 282 of the engine support are also shown as being connected by a plate 289 having an aperture 289' formed therein to receive and guide a rod forming part of the control mechanism of the machine.

Supported by the members 282 and 283 of the engine support is a collar 290 which serves as a support for a conduit forming a portion of a landing wheel control, such as has been particularly described and claimed in my copending application Serial No. 354,522, filed April 12, 1929.

The members 282 and 283 of the pyramidal frame support, near their forward ends, a plurality of bracket arms which are connected by a plate 291 carrying a bushing or bearing 292 for the starting crank of an inertia starting mechanism.

Arms 292, 294 depend from opposite sides of the engine support frame and at their lower ends have bearings 295 and 296 adapted to receive a shaft upon which is mounted certain engine control instrumentalities.

An additonal arm 297 depending from said frame is provided at its lower end with a bracket 298 adapted to support a gasoline strainer.

The rear, converging, ends of the bars 281 to 284, are secured in a box like member 299. Preferably, the bottom and side walls of this member are formed from a single blank 300 (Fig. 20) initially bent to the form shown in Fig. 22. The top of the box 299 is formed by a plate 301 having ears 302 and 303 which are connected by welding to similar ears 304 and 305 provided at the terminals of the plate or strip 300.

As shown in the drawings, the sides of this box like member diverge in correspondence with the lines of the frame bars 281 to 284, the convergent edges being united by a perforated plate 306 welded thereto.

To the plate 301, intermediate the ears 304, 305 thereon, is arranged an upright perforated ear 307 formed by angle brackets 308 and 309 which are welded to plate 301. A pipe line support 300' is secured to the bottom wall of the box 299. The frame bars 281 to 284 are preferably connected to the box 299 by riveting and, as shown, the box is arranged so that the ears thereon are directed upward.

The ring 286 of the engine supporting frame is provided with radially extending eye bolts 310, 311, 312 and 313. To the bolts 310 and 313 are connected the lower ends of struts 314 and 315, the upper ends of which are connected to eye bolts 181 and 182 depending from the front spar member of the center section of the main plane.

To the eye bolts 311 and 312 are connected the lower ends of struts 316, 317, the upper ends of which are secured to the front spar member of the center section of the main plane.

The lower ends of struts 314 to 317 inclusive project forwardly of said front spar member so that the engine will be disposed somewhat in advance of the main plane, the engine supporting frame extending both forward and rearward of said front spar member.

It will also be noted that the said suspension members connected with ring 286 when viewed from the front or rear, as in Fig. 22, are arranged in substantially the form of a W, and that their upper ends are all secured to the front spar member of the center section of the main plane at a specially reinforced section of said spar.

Struts 319, 320 connect the ears 302—304 and 303—305 of the box-like member 299 at the rear of the engine supporting frame with eye bolts 181, 182 of the front spar member of the center section of the main plane to retain the motor supporting frame in a position in which its axis extends substantially parallel to the axis of the body-boat.

The lug formed by the ears 307, 308 and 309 of the box-like member 299 at the rear end of the engine support is connected by a member 321 with an anchor member 206 provided on the rear spar member of the center section of the main plane.

By the arrangement described, the supporting members for the engine mounting are thus disposed in substantially N formation when viewed from the side as in Fig. 24. The suspension system thus specifically described, as a whole, gives the greatest possible stability against lateral, as well as fore and aft, distortive forces.

While I have described and illustrated a brief embodiment of the invention, it is to be understood that except as determined by the appended claims, the invention is not to be limited to the exact details shown or described, as there can, of course, be considerable modification without departing from the invention.

I claim:

1. In an amphibian, a motor support comprising a substantially pyramidal frame disposed on a horizontal axis, and means for securing a motor to the large end of said frame.

2. In an amphibian, a horizontally disposed substantially pyramidal frame including angle bars defining the lateral outlines of the frame, and a motor supporting member fixed to the divergent ends of said bars.

3. In an amphibian, a horizontally disposed substantially pyramidal frame including angle bars defining the lateral outlines of the frame, cross-members joining the bars, and a motor supporting frame fixed to the divergent ends of said bars.

4. In an amphibian, a horizontally disposed substantially pyramidal frame including angle bars defining the lateral outlines of the frame, cross-members joining the bars, and a motor supporting ring fixed to the divergent ends of said bars.

5. In an amphibian, a motor support comprising a plurality of bars arranged to define a substantially pyramidal frame, a motor supporting ring secured to the divergent ends of the bars, and a box in which the rear ends of the bars are secured.

6. In an amphibian, a motor support comprising a plurality of bars arranged to define a substantially pyramidal frame, a motor supporting ring secured to the divergent ends of the bars, a box in which the rear ends of the bars are secured, and suspension members secured to said ring and to said box.

7. In an amphibian, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members connecting said ring at points circumferentially spaced thereon with said front spar at spaced points on the latter, and means connecting the rear end of said frame with said rear spar.

8. In an amphibian, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members connecting said ring at points circumferentially spaced thereon with said spar at spaced points on the latter, suspension members connecting the rear end of said frame with said front spar at said spaced points thereon, and means connecting the rear end of said frame with said rear spar.

9. In an amphibian, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members connecting said ring at points circumferentially spaced thereon with the front spar at spaced points along the latter, suspension members connecting said ring at circumferentially spaced joints with the front spar at a point midway between the first-mentioned connection points thereon, and means connecting the rear end of said frame with said rear spar.

10. In an amphibian, a horizontal motor supporting frame including longitudinal frame members in substantially pyramidal formation, a ring fixed to the divergent ends of said frame members, a plane above said frame and including front and rear spars, said frame projecting forwardly and rearwardly of the front spar, suspension members connecting said ring at points circumferentially spaced thereon with the front spar at spaced points along the latter, suspension members connecting said ring at circumferentially spaced points with the front spar at a point midway between the first-mentioned connection points thereon, suspension members connecting the rear end of said frame with the front spar at spaced points thereon, and means connecting the rear end of said frame with said rear spar.

Signed at College Point, Long Island, in the county of Queens and State of New York, this 24th day of June, A. D. 1929.

IGOR I. SIKORSKY.